Figure 1:
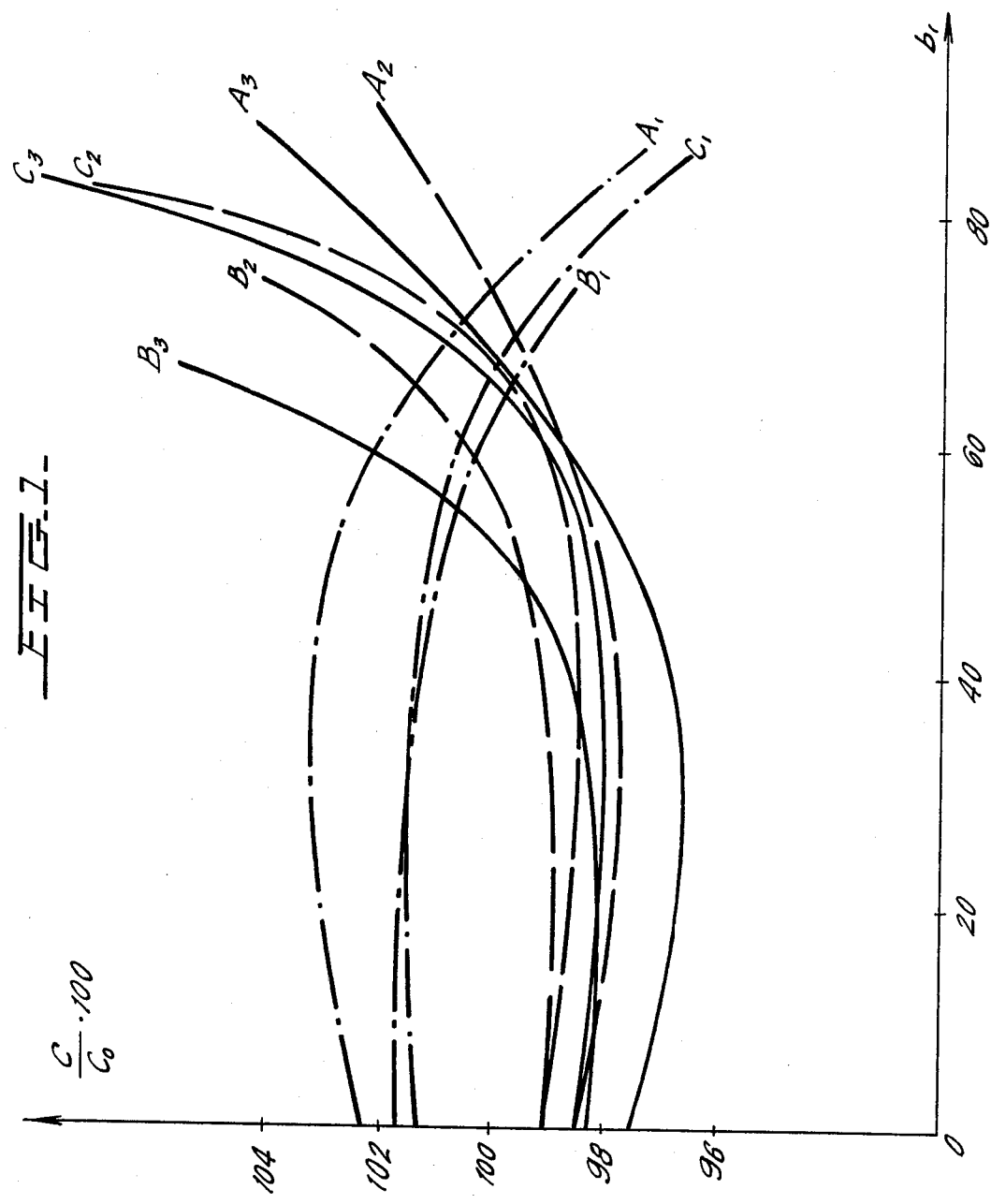

United States Patent [19]
Baumann et al.

[11] 4,106,075
[45] Aug. 8, 1978

[54] CERAMIC CAPACITOR

[75] Inventors: Georg Baumann, Selb; Helmut Hoffmann, Thiersheim, both of Germany

[73] Assignee: Draloric Electronic GmbH, Germany

[21] Appl. No.: 667,612

[22] Filed: Mar. 17, 1976

[51] Int. Cl.² .............................................. H01G 4/12
[52] U.S. Cl. .................................. 361/320; 106/73.3; 106/73.31; 252/63.5; 264/11
[58] Field of Search ................... 317/258; 106/73.31, 106/73.3, 73.2; 252/63.2, 63.5; 361/320; 264/11

[56] References Cited
U.S. PATENT DOCUMENTS

| | | | |
|---|---|---|---|
| 3,529,978 | 9/1970 | Taylor | 106/73.31 |
| 3,582,729 | 6/1971 | Girard | 317/258 |
| 3,619,220 | 11/1971 | Maher | 106/46 |
| 3,666,505 | 5/1972 | Hoffman | 106/73.31 |
| 3,809,973 | 5/1974 | Hurley | 317/258 |
| 3,885,941 | 5/1975 | Maher | 106/73.3 X |

Primary Examiner—E. A. Goldberg
Attorney, Agent, or Firm—Ostrolenk, Faber, Gerb & Soffen

[57] ABSTRACT

The invention concerns a densely sintered ceramic dielectric with a loss factor less than or equal to $1 \times 10^{-3}$ and a substantially linear temperature dependence of the capacitance based on $TiO_2$ and/or $ZrO_2$, and/or the compounds of $TiO_2$, $ZrO$, $Nb_2O_5$ and/or $Ta_2O_5$ with oxides of the alkali metals, alkaline earth metals or rare earth metals in the form generally used for the production of ceramic dielectrics.

11 Claims, 3 Drawing Figures

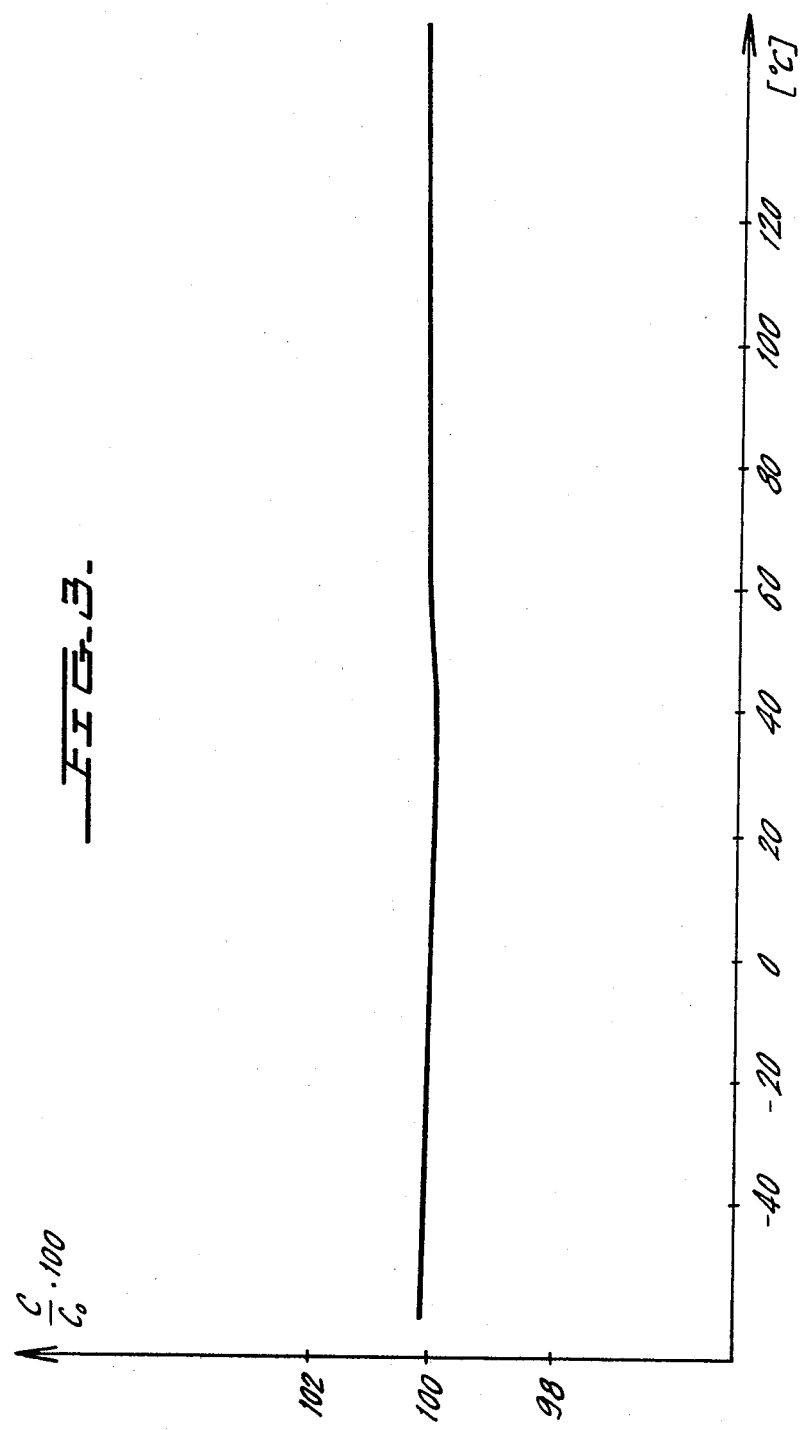

CERAMIC CAPACITOR

BACKGROUND OF THE INVENTION

The presently known dielectric substances generally require sintering temperatures above 1000° C., frequently even above 1200° C. These known ceramic dielectrics are described, for example, in Germ. Pat. No. 977,695, Brit. Pat. No. 598,038, DAS No. 1,646,724, DOS Nos. 2,039,835, 2,264,260, 1,918,021 and DAS No. 1,646,723.

If the ceramic dielectric is to be provided with electrodes, they must be applied, because of the high finish-burning temperature of the dielectric, in a second burn at a lower temperature compatible with the metal electrodes.

When electrodes are also required in the interior of the dielectric, as, for example, in multilayer capacitors, the inner electrodes must withstand the finish-burning temperature of the dielectric. This is at present only possible with platinum metals. A progressive, economical production technique requires, however, more and more storing of the electrodes together with the finish burn. The utilizability of cheaper metals than platinum, e.g., silver or base metals, for the electrodes, is gaining increasing interest today. Since the properties of the pure metals can not be influenced, and alloys always have a lower melting point than their individual components, the only way to achieve lower finish-burning temperatures is to influence the properties of the ceramic materials in such a way that the finish-burning temperature is reduced and can be adapted to the electrode material used.

Various methods have been used for a long time for reducing the finish-burning and sintering temperatures. They are based on the use of glass additives or fluxes, which facilitate the sintering of the powdered raw materials. However, the dielectric constant necessarily drops, and the other electric characteristics do not always attain values technically required today.

Thus, for example, Canadian Pat. No. 920,348 describes a capacitor-dielectric of glass and ceramic powder, whose ferro-electric base material consists of $TiO_2$, $BaTiO_3$ and $ZrO_2$ and which is finish-burnt at temperatures between 650° and 900° C. Only low dielectric constants with temperature coefficients of the dielectric constant between 0 and $-750 \times 10^{-6}$ deg$^{-1}$ can be obtained.

The object of this invention is to overcome the problem of providing a densely-sintered ceramic dielectric where the drop of the dielectric constant necessarily resulting from the addition of sintering aids is reduced, while the temperature dependence of the dielectric constant remains substantially linear, and the loss factor is less than or at most equal to $10^{-3}$, while permitting the use of wide conditions with regard to sintering temperature and firing interval.

DESCRIPTION OF THE INVENTION

The object is achieved according to the invention by a composition according to the following chemical formula:

$$a_1(A) + a_2 \sum_{i=1}^{n} b_i(y_iB_i \cdot z_iM_i)$$

wherein $a_1$ is between 50 and 97% by weight, A denotes a known base material with a substantially linear temperature dependent dielectric constant, $n$ an integer greater than or equal to 1, the sum of all $b_i$ equal to 1, $$a_1 + a_2 \cdot \sum_{i=1}^{n} b_i = 1,$$

the coefficients $y$ and $z$ are integers of 1 to 5, $B_i$ denotes the oxides of the metals or of the alkaline earth metals of the groups IIa, IIb, IVb, Va or Vb of the periodic system, and $M_i$ denotes the glass formers $B_2O_3$, $P_2O_5$, $SiO_2$ or mixtures thereof.

As metal or alkaline earth metal oxides, the oxides of the chemical elements, Ba, Sr, Ca, Mg, Cd, Zn, Pb, Sn, Bi are contained individually or as a mixture in the ceramic material.

The sintering aids are preferably a mixture of three components; in particular, the mixture $$a_2 [b_1(y_1PbO.z_1B_2O_3) + b_2(y_2ZnO.z_2B_2O_3) + b_3(y_3CaO.z_3B_2O_3)]$$

where
$b_1$ is 40 to 72.5% by weight,
$b_2$ is 20 to 43.5% by weight, and
$b_3$ is 0 to 27.5% by weight
and with the coefficients in a ratio of
$y_1 : z_1 = 2 : 1$;
$y_2 : z_2 = y_3 : z_3 = 1 : 1$
leads to a ceramic dielectric where the temperature coefficient of the dielectric constant can be adjusted in a simple manner within wide limits.

It is essential according to the invention to add to the ceramic base materials, which are prepared in known manner (by mixing, grinding and if necessary, preburning and regrinding), stoichiometric metal borates, stoichiometric metal phosphates, or stoichiometric metal silicates as such or preferably as a mixture of these borates, phosphates and silicates. The addition of mixtures of these stoichiometric borates, phosphates and/or silicates instead of separate additions results in an advantageous reduction in the loss factor under otherwise equal preparation and firing conditions for the ceramic material.

The sintering can be effected at temperatures between 750° and 1400° C., preferably between 780° and 960° C. The firing interval presents no problem. It is ±20° C. The indication of a sintering temperature of 960° C. is to be understood as an upper limit, that is, including the firing interval, when silver preparations are used as electrode material in a single and multilayer capacitors which are to be stoved together with the sintering of the ceramic material.

The shaping of the densely sintered ceramic dielectric according to the invention can be effected, for example, by molding, slip-casting or screen printing.

Base metals in addition to silver preparations as electrode material can also be used if the sintering and the stoving of the electrodes are effected in a neutral or slightly reducing atmosphere.

An embodiment of the invention is represented in the drawings. The base material used was a barium polytitanate of the chemical formula $BaO.5TiO_2$ which was mixed with stoichiometric metal borates of the formula $$b_1(2\ PbO.B_2O_3) + b_2(ZnO.B_2O_3) + b_3(CaO.B_2O_3)$$

The amount of barium polytitanate was 60 weight percent.

FIG. 1 shows the variation of the dielectric constant with respect to the dielectric constant at room temperature as $b_1$ is varied. In the curves labeled A, $b_3$ was 0; in those labeled B, $b_3$ was 7.5%; and in those labeled C, $b_3$ was 10%. The subscripts 1, 2 and 3 refer to measurements at $-55°$ C, 25° C and 125° C, respectively.

It can be seen from FIG. 1 that the temperature coefficient of the dielectric constant decreases with rising $CaO.B_2O_3$ content, and that the temperature coefficient of the dielectric constant can be adjusted with $CaO.B_2O_3$.

Figure 2:
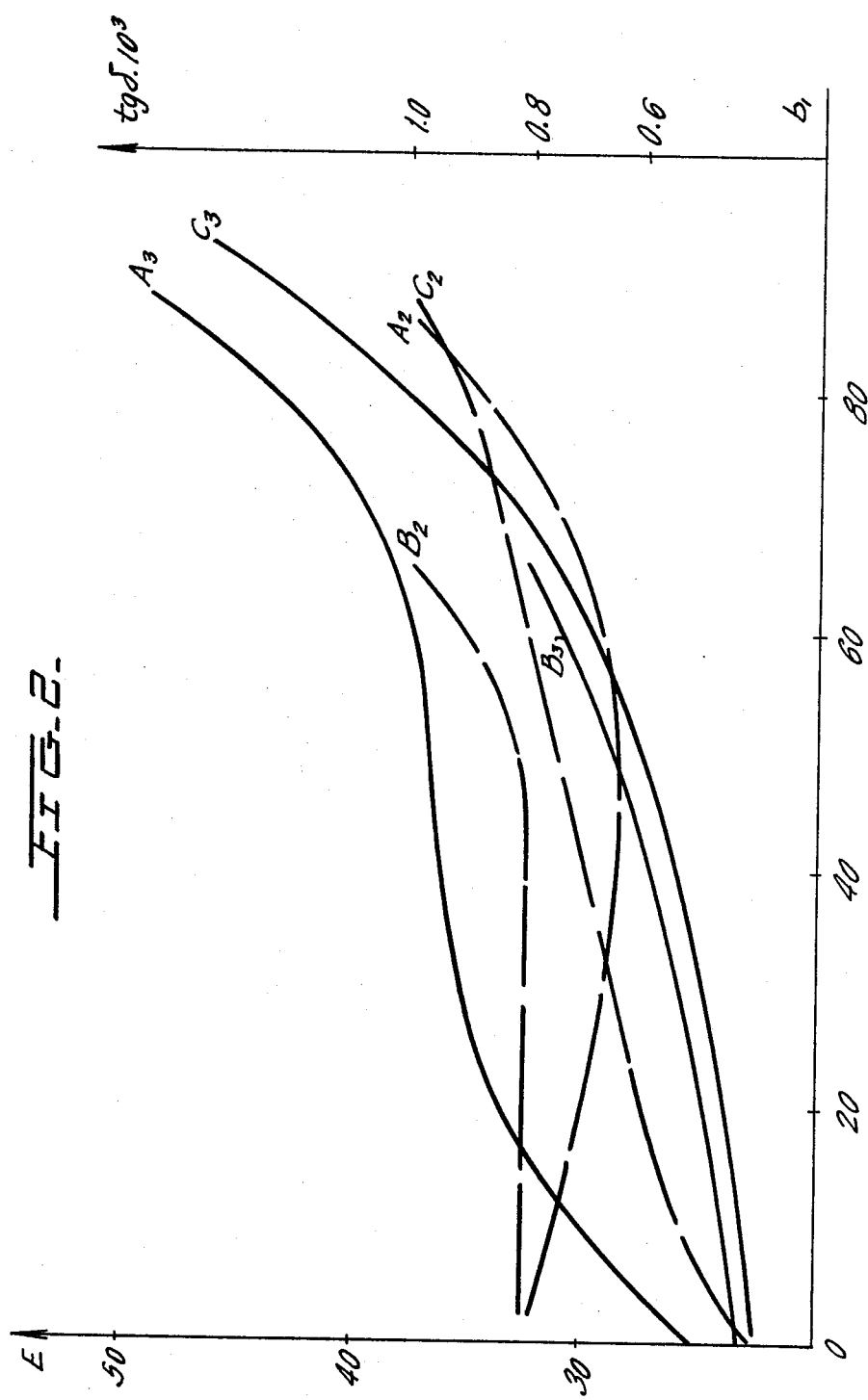

FIG. 2 shows the dielectric constant and the loss factor tg $\delta$ of dielectrics according to the invention as a function of the amount $b_1$ of stoichiometric lead borate $2 PbO.B_2O_3$. The labeling of the curves is the same as in FIG. 1. This figure also shows that the dielectric constant rises to values of about 46 and more.

FIG. 3 shows the variation of the dielectric constant related to room temperature as a function of the temperature in a densely sintered ceramic dielectric of the composition

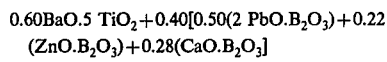

$$0.60BaO.5\ TiO_2 + 0.40[0.50(2\ PbO.B_2O_3) + 0.22 (ZnO.B_2O_3) + 0.28(CaO.B_2O_3]$$

Measurements on pressed densely sintered ceramic disks of the last mentioned composition yielded values for the dielectric constant of 28, a dielectric resistance of more than $10^{13}$ ohm, and a loss factor of $0.7 \times 10^{-3}$ measured at 1 MHz.

The sintering temperature of all dielectrics represented in FIGS. 1–3 was 920° C with a firing range of ±20° C.

It can be seen from these figures and from the following table that dielectrics according to the invention have a high dielectric constant with a low loss factor, despite the addition of sintering aids, which generally reduce the dielectric constant considerably. A particular advantage of this invention is that low sintering temperatures can be used which permits the use of inexpensive electrode materials and savings in energy costs during the sintering and stoving of the electrodes.

The following table shows dielectric compositions according to the invention as well as the dielectric constant (DC), the loss factor (tg $\delta$), the sintering temperature (ST), and the temperature coefficients of the capacitance ($TK_c$) in the range of $-55°$ to $+125°$ C.

We claim:

1. A densely sintered ceramic dielectric with a loss factor of less than or equal to $10^{-3}$ and a substantially linear temperature dependence of the capacitance based on at least one member of the group consisting of $TiO_2$, $ZrO_2$, and the compounds of (a) $TiO_2$, $ZrO_2$, $SnO_2$, $Nb_2O_5$ or $Ta_2O_5$, with (b) oxides of the alkali, alkaline earths or rare earths, characterized in that the chemical composition is between 50 and 97% by weight of a ceramic base material having a substantially linear temperature dependence of the dielectric constant and between 50 and 3% of at least one $(y_iB_iz_iM_i)$ wherein the coefficients $y_i$ and $z_i$ represent integers of 1 to 5 and are in a stoichimetric relationship, $B_i$ are oxides of the metal or alkaline earth metals of the groups II, IV$b$ or V of the periodic system, and $M_i$ represents at least one glass former selected from the group consisting of $B_2O_3$, $P_2O_5$ and $SiO_2$.

2. The dielectric according to claim 1, characterized in that $(y_iB_iz_iM_i)$ is 40–72.5 weight percent of $y_1PbO.z_1B_2O_3$, 20–43.5 weight percent of $y_2ZnO.z_2B_2O_3$ and 0–27.5% weight percent of $y_3CaO.z_3B_2O_3$, wherein $y_1$:$z_1$ = 2:1, $y_2$:$z_2$ = $y_3$:$z_3$ = 1:1.

3. The dielectric according to claim 1, characterized in that $B_i$ is at least one oxide of Ba, Sr, Ca, Mg, Cd, Zn, Pb, Sn and Bi.

4. The dielectric according to claim 1 characterized by 3 $(y_iB_iz_iM_i)$ groups.

5. In a process for the production of a densely sintered ceramic dielectric in which a glass former is added to a ceramic base material having a substantially linear temperature dependence of the dielectric constant, the improvement which comprises employing as said glass former one or a mixture of $(y_iB_iz_iM_i)$, wherein the coefficients $y_i$ and $z_i$ represent integers of 1 to 5 and are in stoichiometric relationship, $B_i$ are oxides of the metal or alkaline earth metals of groups II, IV$b$ or V of the periodic system and $M_i$ is selected from the group consisting of $B_2O_3$, $P_2O_5$, and $SiO_2$, and wherein said ceramic is shaped and finished burned at a temperature of 750° to 1400° C.

6. The process for the production of a densely sintered ceramic dielectric according to claim 5 characterized in that the finish burning is effected at temperatures of 780° to 960° C.

7. The process for the production of a densely sintered ceramic dielectric according to claim 5 characterized in that the shaping is effected by pressing or slip casting.

| Base Material | | | | DC | tg$\delta$ $10^3$ | $TK_c$ $10^6(deg^{-1})$ | $S_T$ ° C. |
|---|---|---|---|---|---|---|---|
| $TiO_2$ | $5PbO \cdot 4B_2O_3$ | $ZnO \cdot B_2O_3$ | | | | | |
| 85 | 3.75 | 11.25 | | 55 | 0.60 | $-670$ | 910 |
| 70 | 15 | 15 | | 51 | 0.45 | $-650$ | 910 |
| 80 | 10 | 10 | | 58 | 0.50 | $-740$ | 910 |
| $3CaTiO_3 \cdot$ CaTiSiO$_5$ | $5PbO \cdot 4B_2O_3$ | $ZnO \cdot B_2O_3$ | | | | | |
| 70 | 15 | 15 | | 40 | 0.90 | $-650$ | 920 |
| $CaTiO_3$ | $5PbO \cdot 4B_2O_3$ | $ZnO \cdot B_2O_3$ | | | | | |
| 80 | 15 | 5 | | 100 | 0.30 | $-1600$ | 1100 |
| $CaO + SiO_2$ + $TiO_2 + SrO_2$ | $5PbO \cdot 4B_2O_3$ | $ZnO \cdot B_2O_3$ | | | | | |
| 80 | 12 | 8 | | 55 | 0.80 | $-400$ | 950 |
| 80 | 10 | 10 | | 43 | 0.60 | $-330$ | 910 |
| 80 | 5 | 15 | | 30 | 0.50 | $-10$ | 910 |
| $BaO \cdot 5TiO_2$ | $2PbO \cdot B_2O_3$ | $ZnO \cdot B_2O_3$ | $CaO \cdot B_2O_3$ | | | | |
| 60 | 32 | 8 | 0 | 44 | 0.90 | $+100$ | 920 |
| 60 | 25 | 10 | 5 | 33 | 0.90 | $+100$ | 920 |
| 60 | 18 | 12 | 10 | 30 | 0.80 | $-100$ | 920 |
| 60 | 20 | 9 | 11 | 28 | 0.70 | $\pm 0$ | 920 |

8. The process for the production of a densely sintered ceramic dielectric according to claim 5 characterized in that the shaping is effected by screen printing.

9. A layer capacitor containing the densely sintered ceramic dielectric of claim 1 and having electrodes in capacitive relationship.

10. The layer capacitor of claim 8 wherein the electrodes are silver.

11. The layer capacitor of claim 8 wherein the electrodes are a base metal.

* * * * *